United States Patent [19]
Kim

[11] Patent Number: 5,736,703
[45] Date of Patent: Apr. 7, 1998

[54] VARIABLE SPEED SELECT KEY AND METHOD

[75] Inventor: Seung K. Kim, Chapel Hill, N.C.

[73] Assignee: Ericsson Inc., Research Triangle Park, N.C.

[21] Appl. No.: 717,804

[22] Filed: Sep. 24, 1996

[51] Int. Cl.⁶ .................................................. H01H 9/00
[52] U.S. Cl. ............................................................ 200/1 B
[58] Field of Search ............................... 200/1 B, 6 R, 200/178, 23, 553, 518, 513

[56] References Cited

U.S. PATENT DOCUMENTS

| | | | |
|---|---|---|---|
| 4,256,931 | 3/1981 | Palisek | 200/5 A |
| 5,486,669 | 1/1996 | Oshgan | 200/556 |
| 5,564,560 | 10/1996 | Minelli et al. | 200/5 R |

*Primary Examiner*—Edward Tso
*Attorney, Agent, or Firm*—Nixon & Vanderhye PC

[57] ABSTRACT

A select key is pivotable in a forward direction and a reverse direction to at least a step position and a fast position. In the fast position, the device functions are scrolled rapidly, and in the step position, the device functions are stepwise scrolled. A select key is centrally disposed on a rocking lever, enabling simple and efficient one-hand operation.

21 Claims, 2 Drawing Sheets

VARIABLE SPEED SELECT KEY AND METHOD

BACKGROUND

The present invention generally relates to mobile communication devices and, more particularly, to a variable speed select key for a mobile communication device or the like enabling step or speed scrolling of device functions to facilitate function selection.

Cellular phones and the like electronic devices are currently being designed with more advanced and greater numbers of device functions. Although these functions provide excellent features for consumers, programming the device becomes increasingly more difficult. A consumer may be overwhelmed by the multitude of functions resulting in unused or improperly programmed functions.

It has been proposed to facilitate programming of a cellular phone utilizing a rotary switch that allows a user to program and operate a cellular phone with one-hand. The rotary switch is rotated to scroll a function list, the speed of scrolling being determined in accordance with the speed of rotary switch rotation. The switch has incorporated therein a push button for selecting a desired function. Once selected, the function parameters can be adjusted, again using the rotary switch.

This implementation, however, requires a delicate mechanical mechanism, which provides for increased manufacturing costs. Moreover, the speed with which the user can scroll through the function list corresponds to how fast a user rotates the switch. Quickly rotating such a rotary switch can be cumbersome.

SUMMARY OF THE INVENTION

It is therefore an object of the invention to provide a variable speed function select key for a cellular phone or the like that obviates the drawbacks associated with conventional select keys. It is a further object of the invention to provide a variable speed function key that enables varying speed selection of device functions with single hand operation.

These and other objects are achieved by the select key according to the present invention. In general, the select key according to the invention includes a centrally disposed SELECT button, an UP button disposed above the SELECT button and a DOWN button disposed below the SELECT button. The UP and DOWN buttons operate in two modes. First, as the user presses the UP or DOWN button, the button makes contact with a first button switch, which is a single step mode switch for scrolling the device functions one step at a time. Second, when the UP or DOWN button is pressed firmer, two button switches are actuated, which is a fast scroll mode for scrolling the device functions quickly.

In particular, the objects according to the invention are achieved by providing a variable speed function select key including a rocking lever having a forward end, a forward intermediate portion, and a center portion, and a plurality of key switches selectively actuated in accordance with a position of the forward end portion, forward immediate portion and the center portion. In one arrangement, the key switches are dome type key switches. The rocking lever may additionally include a reverse end portion and a reverse intermediate portion on opposite sides of the center portion from the forward end portion and the forward intermediate portion. In this regard, the rocking lever is pivotable in a first direction to a forward step position and a forward fast position and in a second direction to a reverse step position and a reverse fast position. The rocking lever may include at least one actuator disposed at the forward intermediate portion and at least one actuator disposed at the reverse intermediate portion. The actuators actuate respective ones of the key switches when the rocking lever is pivoted to the forward step position and the reverse step position, respectively. The rocking lever may further include an end actuator disposed at the forward end portion and an end actuator disposed at the reverse end portion. The end actuators actuate at least respective others of the key switches when the rocking lever is pivoted to the forward fast position and the reverse fast position, respectively. In a preferred form, both the ones of the key switches and the others of the key switches are actuated in the forward fast position and the reverse fast position, respectively. Spring levers may be disposed at the respective forward and reverse end portions, wherein the spring levers urge the rocking lever toward a neutral position.

The rocking lever may additionally be pivotable in the first direction to a forward medium position between the forward step position and the forward fast position and pivotable in the second direction to a reverse medium position between the reverse step position and the reverse fast position.

In one embodiment, three actuators may be disposed at the forward intermediate portion, and three actuators may be disposed at the reverse intermediate portion. In this regard, the actuators may comprise conductive rubber switches that actuate respective ones of the key switches upon contact. A plurality of air pockets or embedded metal dome switches may be formed in the rocking lever adjacent the conductive rubber switches to provide a tactile switch feeling for the user.

In accordance with another aspect of the invention, there is provided a method of operating the variable speed function select key. The method includes the steps of (a) pivoting the rocking lever to one of a forward step position, a forward fast position, a reverse step position and a reverse fast position, (b) sensing the rocking lever position in accordance with the key switches, and (c) scrolling a device function list at one of a step speed and a fast speed and one of a forward direction and a reverse direction in accordance with the rocking lever position sensed in step (b). The method may further include selecting a function in accordance with actuation of a select key. Step (a) may include pivoting the rocking lever to one a forward step position, a forward medium position, a forward fast position, a reverse step position, a reverse medium position, and a reverse fast position. In this regard, step (c) preferably includes scrolling a device function list at one of a step speed, a medium speed and a fast speed and one of a forward direction and reverse direction in accordance with the rocking lever position sensed in step (b).

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
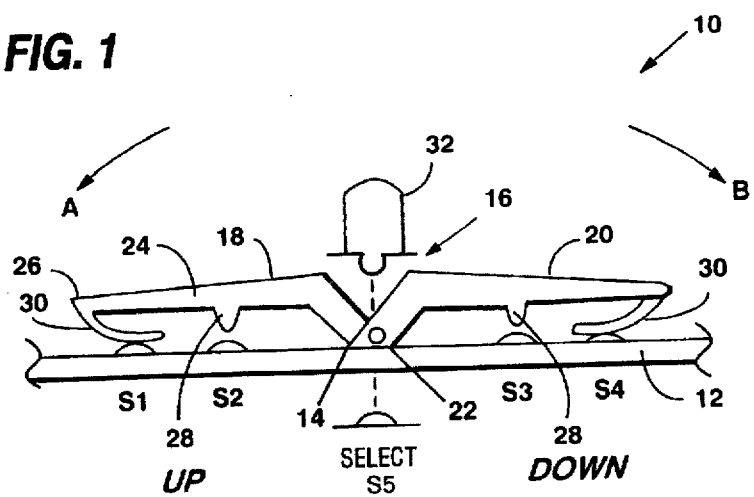
FIG. 1 is a side view of a variable speed key switch according to a first embodiment of the invention.

FIG. 1 illustrates a first embodiment of the variable speed select key according to the present invention. Although the select key will be described in conjunction with a cellular phone, the invention is not meant to be so limited. Those of ordinary skill in the art will contemplate alternative uses for the select key according to the invention.

Referring to FIG. 1, the select key 10 according to the present invention is secured to a PWB 12 of an electrical device such as a cellular phone. The select key 10 is mounted to pivot about a pivot point 14 on the PWB 12 in any suitable manner. The PWB 12 is provided with a plurality of key switches S1–S5 such as conventional dome type key switches. The key switches are wired in a conventional manner to effect display and scrolling of device functions as well as selection of device functions. The details of the wiring circuit will therefore not be further described.

The select key 10 includes a rocking lever 16, which can be formed as a one piece integral member or in two or more pieces and is preferably formed of a plastic material. The rocking lever 16 includes an up arm 18 and a down arm 20. The up arm 18 and down arm 20 are identical in structure, and only the up arm 18 will be described.

As shown in FIG. 1, the up arm 18 extends from the pivot point 14 at an angle away from the PWB 12. The arm 18 includes a center portion 22, which is coincident with the center portion 22 of the down arm 20, an intermediate portion 24, and an end portion 26. An actuator 28 is disposed at the intermediate portion 24 facing the key switches S1–S5 and is preferably formed integral with the rocking lever 16 adjacent one of the key switches S1–S5. An end actuator 30 is disposed at the end portion 26 and is also preferably formed integral with the rocking lever 16. As shown in FIG. 1, the end actuator 30 in the illustrated embodiment is a spring lever that urges the rocking lever 16 toward a neutral position. A select button 32 is disposed at the center portion 22 adjacent key switch S5.

In operation, the rocking lever 16 is pivotable in a first direction indicated by arrow A and a second direction indicated by arrow B. As the rocking lever 16 is pivoted in the first direction, for example, the end actuator 30 actuates key switch S1, which corresponds to a forward step position. In the forward step position, the function menu of the cellular phone is slowly scrolled in the forward direction. As the user further pivots the rocking lever 16 in the first direction, the rocking lever is pivoted to a forward fast position where the actuator 28 disposed at the intermediate portion 24 actuates key switch S2. In this position, the function menu is quickly scrolled in the forward direction. When the user releases the rocking lever 16, the spring lever 30 urges the rocking lever 16 to a neutral position (i.e., a position where none of the key switches S1–S5 is actuated by the lever). After the user has scrolled to the desired function, the select key 32 can be depressed, thereby depressing key switch S5. Once a particular function has been selected, the select key 10 according to the invention can be further utilized to select parameters of the selected function. In the fast position, preferably both key switches S1 and S2 are depressed (or key switches S3 and S4 if the rocking lever 16 is pivoted in the second direction).

Figure 2:
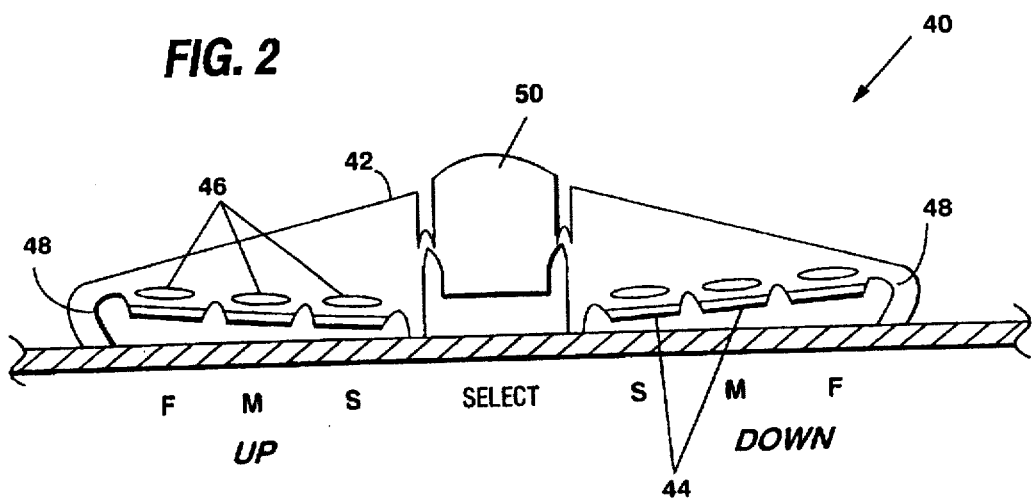
FIG. 2 is a cross-sectional view of a key switch according to a second embodiment of the invention.
Figure 3:
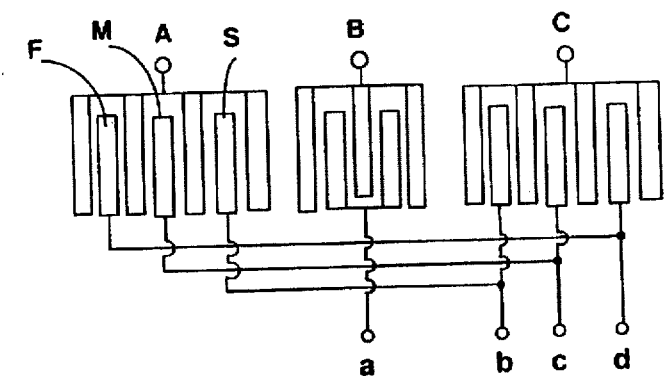
FIG. 3 illustrates a conducting map for the switch illustrated in FIG. 2.

FIG. 2 illustrates an alternative embodiment of the select key 40 according to the invention. In this embodiment, the rocking lever 42 is integrally molded of rubber and similarly includes an up arm and a down arm pivoting about a central area attached to a PWB. In this embodiment, however, the rocking lever 42 is molded as a part of a plurality of conductive rubber type key switches 44 of a known construction. Each arm of the rocking lever 42 in this embodiment is provided with three key switches corresponding to a slow scrolling speed, a medium scrolling speed, and a fast scrolling speed, respectively. The contact diagram for the PWB is illustrated in FIG. 3.

Air pockets 46 are preferably formed in the rocking lever 42 adjacent each of the key switches 44 during molding of the rocking lever 42 and include an air inlet/outlet hole 46A. A small air bag having an air inlet/outlet hole may alternatively be molded with the rocking lever 42. The air pockets 46 provide some tactile feeling in each speed position. As the lever is pivoted between each position, air in the air pockets 46 is pushed out, and when the lever is released, air is drawn into the air pockets. By virtue of the air pockets 46, a user will be able to feel when the rocking lever is pivoted to the step position (corresponding to slow scrolling), a medium position (corresponding to medium speed scrolling), and the fast position (corresponding to fast speed scrolling). As an alternative to the conductive rubber type key switches with air pockets 46, the rocking lever 42 in this embodiment may be molded with dome type key switches inside the air pockets.

The rocking lever 42 is further provided with flaps 48 disposed at the end portions thereof. The flaps 48 serve as springs for the rocking lever 42, urging the rocking lever 42 toward a neutral position.

The select key 40 according to this embodiment operates in a similar manner as the select key 32 from the first embodiment, however, as shown, preferably utilizes the conductive rubber type key switches.

Figure 4:
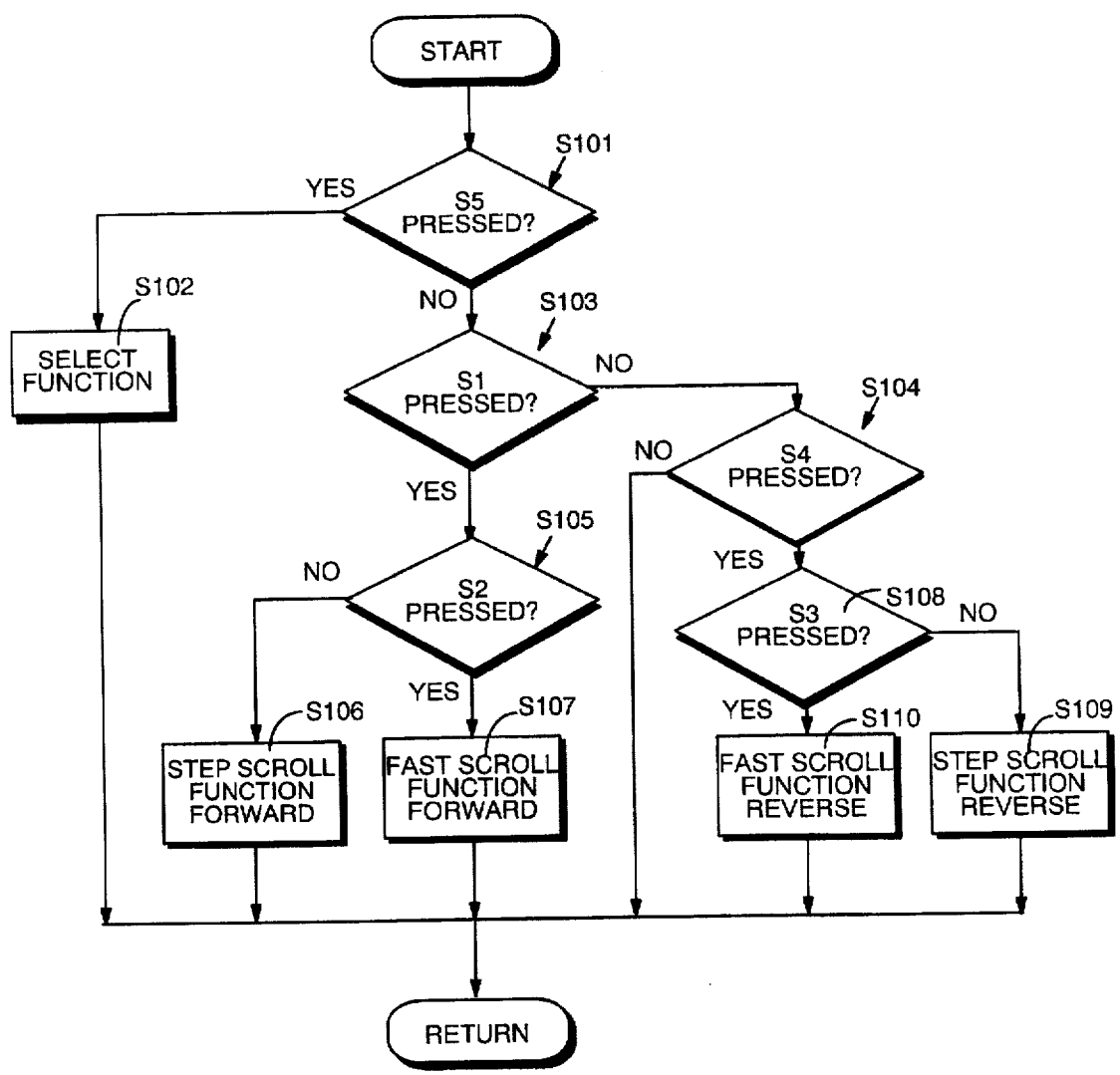
FIG. 4 is a flow chart illustrating the operation of the variable speed function select key according to the invention.

FIG. 4 is a flow diagram illustrating the CPU process for the select key according to the invention. The CPU continuously scans the key switches in accordance with a known matrix key switch scan circuit. The CPU first determines whether the select key S5 has been depressed in step S101. If so (YES in step S101), the SELECT function is processed in step S102 and the operation returns. If not (NO in step S101), the CPU checks whether any other key switches have been depressed. In step S103, the CPU determines whether key switch S1 is depressed. If not, in step S104, the CPU determines whether the key switch S4 is depressed. If key switch S1 is depressed (YES in step S103), the CPU then determines whether key switch S2 is also depressed in step S105. If not (NO in step S105), the CPU determines that the select lever is pivoted to the step position, and the function list is step scrolled in the first (forward) direction (step S106). If key switch S2 is also depressed (YES in step S105), then the SELECT key is in the fast position, and the function list is scrolled at a fast speed (step S107).

The CPU performs a similar operation with respect to the select key pivoted in the second (reverse) direction in steps S108–S110. In the event that the select key includes more than two scrolling positions, corresponding additional steps are added to the flow diagram.

In accordance with the present invention, a simple and reliable select key can be utilized for efficient one-hand selection of device functions. Moreover, the select key according to the invention is typically molded with few parts, which minimizes manufacturing expense. Still further, the configuration of the select key according to the invention including a rocking lever provides for easy one-hand operation of the device without requiring cumbersome rotation of a rotary switch or the like.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A variable speed function select key comprising:

a rocking lever having a forward end portion, a forward intermediate portion, and a center portion; and a plurality of key switches selectively actuated in accordance with a position of said forward end portion, said forward intermediate portion and said center portion.

2. A variable speed function select key switch according to claim 1, wherein said rocking lever comprises a reverse end portion and a reverse intermediate portion on an opposite side of said center portion from said forward end portion and said forward intermediate portion.

3. A variable speed function select key switch according to claim 2, wherein said rocking lever is pivotable in a first direction to a forward step position and a forward fast position and in a second direction to a reverse step position and a reverse fast position.

4. A variable speed function select key according to claim 3, wherein said rocking lever comprises at least one actuator disposed at said forward intermediate portion and at least one actuator disposed at said reverse intermediate portion, said actuators actuating respective ones of said key switches when said rocking lever is pivoted to said forward step position and said reverse step position, respectively.

5. A variable speed function select key according to claim 4, wherein said rocking lever comprises an end actuator disposed at said forward end portion and an end actuator disposed at said reverse end portion, said end actuators actuating at least respective others of said key switches when said rocking lever is pivoted to said forward fast position and said reverse fast position, respectively.

6. A variable speed function select key according to claim 5, wherein both said ones of said key switches and said others of said key switches are actuated in said forward fast position and said reverse fast position, respectively.

7. A variable speed function select key according to claim 5, wherein said end actuators comprise spring levers disposed at said respective forward and reverse end portions, respectively, said spring levers urging said rocking lever toward a neutral position.

8. A variable speed function select key according to claim 3, wherein said rocking lever is pivotable in said first direction to a forward medium position between said forward step position and said forward fast position, and wherein said rocking lever is pivotable in said second direction to a reverse medium position between said reverse step position and said reverse fast position.

9. A variable speed function select key according to claim 2, wherein said rocking lever comprises three actuators disposed at said forward intermediate portion and three actuators disposed at said reverse intermediate portion, said actuators comprising conductive rubber switches that actuate respective ones of said key switches upon contact.

10. A variable speed function select key according to claim 9, further comprising a plurality of air pockets formed in said rocking lever adjacent said actuators.

11. A variable speed function select key according to claim 10, wherein said air pockets each comprise an air inlet/outlet hole.

12. A variable speed function select key according to claim 10, further comprising a dome type switch disposed is each of said air pockets, thereby providing some tactile feeling when the key is depressed.

13. A variable speed function select key switch according to claim 1, wherein said rocking lever is pivotable to a step position and a fast position.

14. A variable speed function select key according to claim 13, wherein said rocking lever comprises at least one actuator disposed at said forward intermediate portion, said actuator actuating one of said key switches when said rocking lever is pivoted to said step position.

15. A variable speed function select key according to claim 14, wherein said rocking lever comprises an end actuator disposed at said forward end portion, said end actuator actuating another of said key switches when said rocking lever is pivoted to said fast position.

16. A variable speed function select key according to claim 15, wherein both said one of said key switches and said another of said key switches are actuated in said fast position.

17. A variable speed function select key according to claim 13, wherein said rocking lever is pivotable to a medium position between said step position and said fast position.

18. A variable speed function select key according to claim 1, further comprising a select button disposed at said center portion and adjacent a corresponding one of said key switches.

19. A variable speed function select key according to claim 1, wherein said key switches are dome type key switches.

20. A method of operating a variable speed function select key including a rocking lever and a plurality of key switches selectively actuated in accordance with a position of the rocking lever, the method comprising:

(a) pivoting the rocking lever to one of a forward step position, a forward medium position, a forward fast position, a reverse step position, a reverse medium position and a reverse fast position;

(b) sensing the rocking lever position in accordance with the key switches; and (c) scrolling a device function list at one of a step speed, a medium speed and a fast speed and one of a forward direction and reverse direction in accordance the rocking lever position sensed in step (b).

21. A method according to claim 20, further comprising selecting a function in accordance with actuation of a select key.

* * * * *